US011702375B2

(12) United States Patent
Atkinson et al.

(10) Patent No.: US 11,702,375 B2
(45) Date of Patent: Jul. 18, 2023

(54) FOOD WASTE RECYCLING APPLIANCE

(71) Applicant: WHIRLPOOL CORPORATION, Benton Harbor, MI (US)

(72) Inventors: Wade Atkinson, Benton Harbor, MI (US); Mohsin Mahamadshafi Attar, Maharashtra (IN); Abhishek Pradeep Buzruk, Maharashtra (IN); Rajwardhan Deshmukh, Maharashtra (IN); Rachel Maghas, Kalamazoo, MI (US); Bhushan Vijay Patil, Maharashtra (IN); Heron Plaza Rico, Saint Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 258 days.

(21) Appl. No.: 17/214,871

(22) Filed: Mar. 28, 2021

(65) Prior Publication Data

US 2021/0214283 A1 Jul. 15, 2021

Related U.S. Application Data

(63) Continuation of application No. 16/189,277, filed on Nov. 13, 2018, now Pat. No. 10,995,042.

(51) Int. Cl.
*C05F 17/907* (2020.01)
*B02C 18/00* (2006.01)
(Continued)

(52) U.S. Cl.
CPC ........ *C05F 17/907* (2020.01); *B01F 33/8305* (2022.01); *B02C 18/0092* (2013.01);
(Continued)

(58) Field of Classification Search
CPC .... C05F 17/907; C05F 17/60; B01F 33/8305; B01F 33/83611; B01F 27/921; B02C 18/0092; B02C 23/10
(Continued)

(56) References Cited

U.S. PATENT DOCUMENTS

| 3,608,838 A | 9/1971 | Lundin |
| 5,551,170 A | 9/1996 | Sakatani et al. |
| 5,634,600 A | 6/1997 | Kubota et al. |
| 7,762,713 B2 | 7/2010 | Koh |

(Continued)

FOREIGN PATENT DOCUMENTS

| CN | 107824303 A | 3/2018 |
| DE | 19731500 A1 | 1/1999 |

(Continued)

OTHER PUBLICATIONS

Heavy Duty Solar Powerered Automatic Chicken Coop Door—Netscraps; http://blog.netscraps.com/diy/heavy-duty-solar-powered-automatic-chicken-coop-door.html; Mar. 28, 2015.

*Primary Examiner* — Michael L Hobbs
*Assistant Examiner* — Lenora A Abel
(74) *Attorney, Agent, or Firm* — McGarry Bair PC

(57) ABSTRACT

A food recycler can include a housing defining an interior and an access opening to the interior. A mixing bin can be located within the interior and can have an inlet and an outlet. The food recycler can further include an output bin, the output bin having an inlet. The outlet of the mixing bin can couple or connect to the inlet of the output bin. The food recycler further has a transfer assembly for transferring food waste from the mixing bin to the output bin. The transfer assembly includes a chute mounted to the housing and operably coupling the first outlet of the mixing bin to the second inlet of the output bin, and at least one vibration (Continued)

damper positioned between the housing and the chute configured to allow flexibility of the chute to vibrate relative to the housing.

20 Claims, 14 Drawing Sheets

(51) Int. Cl.
*B01F 33/83* (2022.01)
*B02C 23/10* (2006.01)
*C05F 17/60* (2020.01)
*B01F 27/091* (2022.01)
*B01F 27/921* (2022.01)
*B01F 33/80* (2022.01)

(52) U.S. Cl.
CPC ........... *B01F 27/091* (2022.01); *B01F 27/921* (2022.01); *B01F 33/83611* (2022.01); *B02C 23/10* (2013.01); *C05F 17/60* (2020.01)

(58) Field of Classification Search
USPC ...................................................... 435/290.2
See application file for complete search history.

(56) References Cited

U.S. PATENT DOCUMENTS

| | | |
|---|---|---|
| 8,562,916 B2 | 10/2013 | Yamanobe et al. |
| 9,044,795 B2 | 6/2015 | Tyler |
| 9,308,535 B2 | 4/2016 | Delgado et al. |
| 9,862,630 B2 | 1/2018 | Platts et al. |
| 10,000,429 B2 | 6/2018 | Maghas et al. |
| 2013/0217111 A1 | 8/2013 | Chang |
| 2013/0260446 A1 | 10/2013 | Berberet et al. |
| 2015/0376882 A1 | 12/2015 | Park et al. |
| 2016/0122255 A1 | 5/2016 | Fransen et al. |
| 2016/0207845 A1 | 7/2016 | Delgado et al. |
| 2016/0346817 A1 | 12/2016 | Carmel |
| 2017/0260108 A1 | 9/2017 | Koh |
| 2017/0260111 A1 | 9/2017 | Maghas et al. |
| 2018/0029948 A1 | 2/2018 | Atkinson et al. |
| 2018/0057374 A1 | 3/2018 | Maghas et al. |
| 2020/0024789 A1 | 1/2020 | Guzman et al. |

FOREIGN PATENT DOCUMENTS

| | | |
|---|---|---|
| EP | 1274334 A1 | 1/2003 |
| JP | 2003284509 A | 10/2003 |
| JP | 2009219598 A | 10/2009 |
| KR | 20040076914 A | 9/2004 |
| KR | 100715044 B1 | 5/2007 |
| KR | 101329545 B1 | 11/2013 |
| KR | 101794611 B1 | 11/2017 |
| KR | 101872204 B1 | 6/2018 |

US 11,702,375 B2

FOOD WASTE RECYCLING APPLIANCE

CROSS REFERENCE TO RELATED APPLICATIONS

This application is a continuation of U.S. patent application Ser. No. 16/189,277 filed Nov. 13, 2018, now U.S. Pat. No. 10,995,042, issued May 4, 2021, which is hereby incorporated herein in its entirety.

BACKGROUND

Food waste recycling appliances or food recyclers are known to implement a food waste recycling cycle for biologically and chemically decomposing organic material, such as food waste, into recycled food waste or compost for use as a fertilizer and soil amendment. The food waste recycling cycle can be implemented in a food waste recycling bin by providing water, heat and aeration to the waste, and can require a period of time for completion. When the food waste has been at least partially recycled by the food waste recycling cycle, the at least partially recycled food waste can be transferred from the food waste recycling bin to an output bin, which can be an access drawer that is selectively accessible to a user for collection of the recycled food waste.

BRIEF SUMMARY

An aspect of the present disclosure relates to a food recycler comprising a housing defining an interior and an access opening to the interior, a mixing bin located within the interior and defining a mixing chamber having a first inlet accessible via the access opening and a first outlet, an output bin defining an output chamber having a second inlet and a second outlet, and a transfer assembly for transferring food waste from the mixing bin to the output bin. The transfer assembly includes a chute mounted to the housing and operably coupling the first outlet of the mixing bin to the second inlet of the output bin, and at least one vibration damper positioned between the housing and the chute configured to allow flexibility of the chute to vibrate relative to the housing.

DETAILED DESCRIPTION

Figure 1:
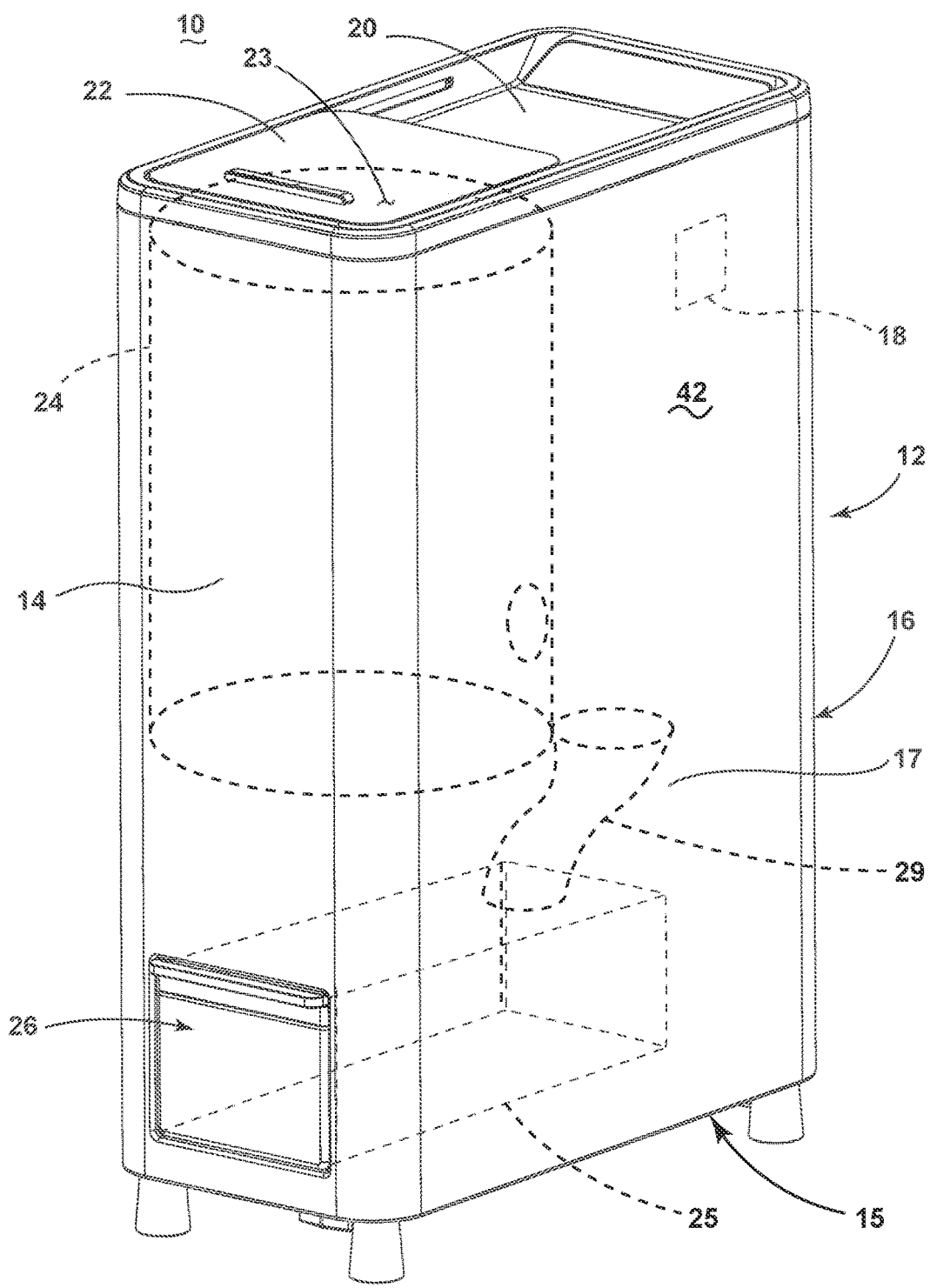
FIG. 1 is a perspective view of a food recycler.

FIG. 1 illustrates a perspective view of a food recycler 10 or a food recycling appliance for transforming organic material into recycled food waste by way of a food waste recycling cycle of operation. While a "food recycler" or "food waste recycling appliance" is described, aspects of the present disclosure can be equally applicable for similar devices, such as composters or biological waste digesters. In addition, while the term "food waste" is used, it will be understood that aspects of the present disclosure can be equally applicable for other type of non-food organic material waste, non-limiting examples of which include leaves and other plant matter. The food recycler 10 can include a housing 12 defining an interior 42 and having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the food recycler 10 including, but not limited to, a cabinet and a frame.

The top wall 20 can include a cover 22 slidably mounted to a portion of the top wall 20 for sliding movement between opened or closed positions to enable access to interior components of the food recycler 10. The cover 22 can be any barrier that provides selective access for inputting organic material into the food recycler 10, including, but not limited to, a hingedly, slidably, or removably mounted door, drawer, panel, or lid. While shown in FIG. 1 as coupled to the top wall 20, the cover 22 can be mounted to any exterior wall enclosing the housing 12, including, but not limited to, the front wall 14.

The top wall 20, as well as the remainder of the housing 12, can be formed of any material suitable for construction of the housing structure including, but not limited to, metal such as steel or steel alloy, plastic, composite materials such as a hardened polymer composite material, and combinations thereof. Some models of food recyclers 10 can include decorative panels that can be mounted on the housing 12 or on one or more walls.

When in the opened position, the cover 22 provides access to the interior 42 of the housing 12. In the opened position, the cover 22 can further expose any element of the food recycler 10 interior 42 of the housing 12 including, but not limited to, one or more water fill inlets for supplying water to the food recycler 10 and one or more enzyme dispenser inlets. A composting bin or food recycling bin, illustrated herein as a mixing bin 24, is provided within the housing 12 and includes a fill opening 23. The mixing bin 24 can be disposed beneath the cover 22 such that the cover 22 provides selective access to the fill opening 23 of the mixing bin 24 as the cover 22 is opened/closed.

An access drawer 26 defines an output bin 25, which can be coupled to the mixing bin 24 by a conduit, illustrated herein as a chute 29. The access drawer 26 is selectively removable from the housing 12 by sliding in or out of the housing 12 through an opening in the front wall 14. The access drawer 26 is a drawer slidably or removably mounted to the housing 12 on a horizontal axis for movement between opened and closed positions such that selective access to the output bin 25 is permitted. The access drawer 26 can be provided with a latch (not shown) that holds the access drawer 26 in a closed position. The latch (not shown) can be opened at will by a user to allow the access drawer 26 to be removed from the housing 12. It will be understood, however, that access to the interior 42 of the food recycler 10 via the front wall 14 can be provided in any suitable way, including, but not limited to, a door slidably or pivotally connected to the front wall 14. The access drawer can be detachably mounted to an internal side of the housing 12 and is accessible from outside the housing 12. The access drawer 26 can be removable from the interior 42 of the housing 12 so that the contents of the output bin 25 can be discharged at will by a user, as, for example, by dumping the contents of the output bin 25 onto a garden.

Operation of the food recycler 10 can be conventional and is not critical to the aspects of the present disclosure. A complete cycle of operation can include receiving organic material into the mixing bin 24, mixing the organic material within the mixing bin 24, which can include aerating the organic material, while simultaneously drying the organic material, and then transferring the organic material to the output bin 25, after which the recycled organic material can be removed. Suitable mechanisms for a complete cycle of operation for the food recycler are set forth in detail in U.S. Pat. No. 10,000,429, issued Jun. 19, 2018, and titled "Method and Apparatus for Operating a Composter Device," which is incorporated herein by reference in its entirety.

During a composting cycle of operation, refuse, such as organic food waste or other biodegradable waste, such as leaves, can be provided by the user to the interior of the mixing bin 24 through the opening or cover 22 of the top wall 20. The refuse can be supplied to the interior of the mixing bin 24 over a period of time until the volume or weight of the refuse satisfies a predetermined threshold, as determined by a level sensor or a weight sensor. The composting cycle can begin when the level of refuse reaches a predetermined level or it can begin as soon as refuse is placed in the mixing bin 24. Alternatively, the composting cycle can initiate as long as the level sensor or weight sensor determines that the refuse is received in the mixing bin 24.

The refuse can be uniformly mixed and, for example, fragmented or triturated by rotating a reducing mechanism, illustrated herein as a stirrer 60, positioned near the lower portion of the mixing bin 24 at a predetermined speed according to the cycle of operation. Reducing can occur periodically or continuously. The refuse can also be provided with heat, water or aeration according to the cycle of operation to promote the decomposition of the refuse.

During the composting process, an optional heating element can be controllably operated to maintain the temperature in the mixing bin 24 within a predetermined temperature range. The predetermined temperature range can vary with the progress of composting process, and the temperature can be determined by a temperature sensor. Further, the relative humidity level in the mixing bin 24 can also be controlled by controllably operating the optional heating element to enhance the overall rate of composting process.

While the composting process proceeds in the mixing bin 24, partially composted refuse is transferred from the mixing bin 24 to the access drawer 26. Enzymes can be provided to the mixing bin 24, the access drawer 26, or both by an enzyme dispenser for continuing and enhancing the composting process. The refuse can be further decomposed by controlling the amount of water and aeration in the refuse in the access drawer 26.

Figure 2:
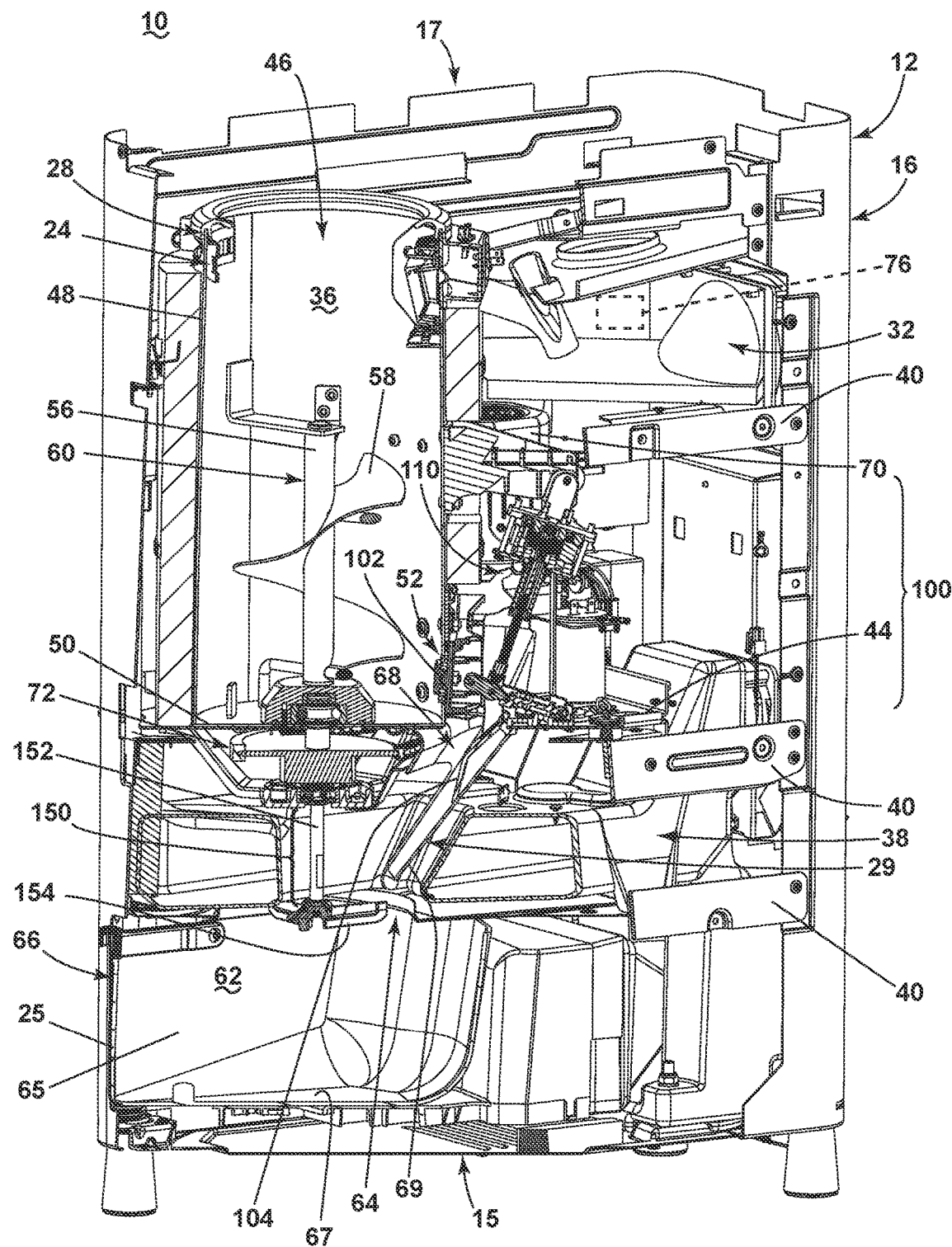
FIG. 2 is an example cross-sectional illustration of the food recycler of FIG. 1.

FIG. 2 illustrates a cross-sectional view of the food recycler 10 of FIG. 1 with portions of the housing 12 removed for clarity. The housing 12 can also include a porous wall (not shown), which can be provided as a portion of the housing, wherein the porous wall is configured to allow ambient air to flow into or out of the interior 42 of the housing 12. It will be understood that one or more of any of the previously described walls 14, 16, 17, 20, or a lower wall 15, can include a porous portion.

The mixing bin 24 can be fixedly or removably mounted to the housing 12. The housing 12 can comprise at least one mounting bracket 40 that can be coupled to the housing 12 and, by way of non-limiting example, can extend along the side wall 17 between the rear wall 16 and the front wall 14. At least one mounting plate 44 can be coupled to at least one of the mounting brackets 40 and can provide a mounting surface for at least the mixing bin 24.

The mixing bin 24 can comprise a side wall 48, illustrated herein as a cylindrical side wall 48, and a mixing bin bottom wall 50, and can define a mixing chamber 36 configured to receive organic material from outside of the food recycler 10, either directly or indirectly. The mixing bin 24 can include an open top 28 of the mixing bin 24 for receiving refuse through the top wall 20 of the food recycler 10. The top wall 20 can also include a funnel (not shown) located to align with the open top 28 of the mixing bin 24 such that refuse placed in through the top wall 20, which can be through the funnel, is guided into the open top 28 of the mixing bin 24. Thus, the funnel or the open top 28 can define a mixing bin inlet 46, which can be thought of as a first inlet of the food recycler 10. The mixing bin 24 can further define a mixing bin outlet 52, which can be thought of as a first outlet of the food recycler 10. While the mixing bin outlet 52 is illustrated herein as being provided at a lower portion of the side wall 48, it will be understood that the mixing bin outlet 52 could be provided in the mixing bin bottom wall 50 or can span both the side wall 48 and the mixing bin bottom wall 50.

The stirrer 60, can be provided adjacent or within the mixing bin 24. While the reducing mechanism is illustrated herein as a stirrer 60, it will be understood that the reducing mechanism can be in the form of a mixer, an auger, a grinding wheel, a grinding blade, any chopping mechanism, or any like device or combination thereof that grinds, shears chops, mixes, breaks, or otherwise reduces the particle sizes of refuse by the operation of the stirrer 60 or uniformly mixing refuse with water, air or enzymes that can be introduced in the mixing bin 24 for transforming the refuse into recycled food waste or compost. The stirrer 60 can comprise a stirrer drive shaft 56 and at least one blade 58 located within the mixing chamber 36 and coupled to and extending radially outward from the stirrer drive shaft 56. While the blades 58 are illustrated herein as helical blades 58, other blade 58 configurations are within the scope of the present disclosure.

A motor assembly 70 can be provided inside the cabinet 12 and can be operably coupled to the stirrer 60 to operate, rotate, toggle, or actuate the stirrer 60. As shown, the motor assembly 70 can be operatively coupled with the stirrer drive shaft 56 by way of a belt or pulley system, illustrated herein as a drive train 72. The motor assembly 70 can be a brushless permanent magnet (BPM) motor. Alternately, other motors such as an induction motor or a permanent split capacitor (PSC) motor can also be used. The motor assembly 70 can be configured to operate the stirrer 60 at different speeds during the cycle of operation to facilitate the reducing or mixing of refuse in the mixing chamber 36 of the mixing bin 24.

The output bin 25 can comprise a bottom portion 67 with a side portion 65 extending upwardly from the bottom portion 67 to define an output chamber 62, an output bin inlet 64, and an output bin outlet 66. The output bin inlet 64, which can be thought of as a second inlet of the food recycler 10, can be provided at an upper portion of the output bin 25 and operably coupled to the mixing bin outlet 52. The output bin outlet 66, which can be thought of as a second outlet of the food recycler 10, can be provided in the side portion 65 of the output bin 25. The output chamber 62 can be configured to receive at least partially recycled food waste that is transferred from the mixing bin 24 to the output bin 25 and can have at least a portion of the output chamber 62 that is positioned directly below at least a portion of the mixing chamber 36.

A wiper assembly 150 can be operably coupled to the stirrer drive shaft 56 and provided between the mixing bin 24 and the output bin 25 to evenly distribute recycled food waste within the output bin 25. The wiper assembly 150 can at least partially overlie the output chamber 62 of the output bin 25, and specifically such that the wiper assembly 150 at least partially overlies the output bin inlet 64. The wiper assembly 150 can comprise a wiper drive shaft 152 and at least one wiper 154.

The chute 29, can extend between the mixing bin 24, such as from a lower portion of the mixing bin 24, and the output bin 25. Specifically, the chute 29 can operably couple the mixing bin 24 with the output bin 25 such that at least partially recycled food waste can selectively exit the mixing bin 24 through the mixing bin outlet 52 to confront the chute 29, then pass from the chute 29 to the output bin inlet 64.

A transfer mechanism, illustrated herein as a transfer assembly 100, can be operably coupled to the chute 29 and configured to assist the transfer of material from the mixing bin 24 to the output bin 25. Examples of such a transfer mechanism can include, but are not limited to, a rotatable auger, a conveyor, and the like. As illustrated herein, the transfer assembly 100 can comprise a mechanical mover 110. The mechanical mover 110 can be operably coupled to the chute 29 to mechanically move compost or recycled food waste from the mixing bin outlet 52 toward the output bin inlet 64 as the mechanical mover 110 moves between opened and closed positions. Further, the mechanical mover 110 can be operably coupled to both an outlet door 102 and can comprise a scraper 104 operably coupled to the chute 29. In the opened position of the mechanical mover 110 and the outlet door 102, the mixing bin outlet 52 is unblocked to allow recycled food waste to pass through the mixing bin outlet 52 and the scraper 104 is in a raised position. In the closed position of the mechanical mover 110 and the outlet door 102, the mixing bin outlet 52 is closed by the outlet door 102 such that recycled food waste is prevented from passing through the mixing bin outlet 52 and the scraper 104 is in a lowered position.

The food recycler 10 can further include a heating element or heat exchanger (not shown), an evaporation chamber or condensate reservoir 38, a filter to remove undesirable elements from the air flow, such as odors or microbes originating from the food recycling cycle of operation, and an air supply system 32 to provide air flow for the food recycler 10, all of which can be located within an interior 42 of the housing 12. Examples of suitable filter materials that can be included with the food recycler 10 can include, but are not limited to, charcoal, previously composted material, a biofilter material, or activated carbon. Additional contemplated filters can include filters utilizing ultraviolet lighting or ozone, for example, via an ozone generator, to provide at least a portion of the filtering of undesirable elements from the airflow within the interior 42 of the housing 12.

The food recycler 10 can additionally include a number of sensors 76 positioned throughout the device 10 and communicatively coupled with the controller 18 to sense or measure characteristics, values, or indicators utilized to control or operate the food recycler 10 or the food waste recycling cycle of operation. The sensors 76 can include, but are not limited to, humidity sensors, temperature sensors, moisture sensors, level sensors, odor sensors, pH sensors, water level sensors, weight sensors, airflow sensors, and the like, and can be placed at any suitable location within the food recycler 10.

Figure 3:
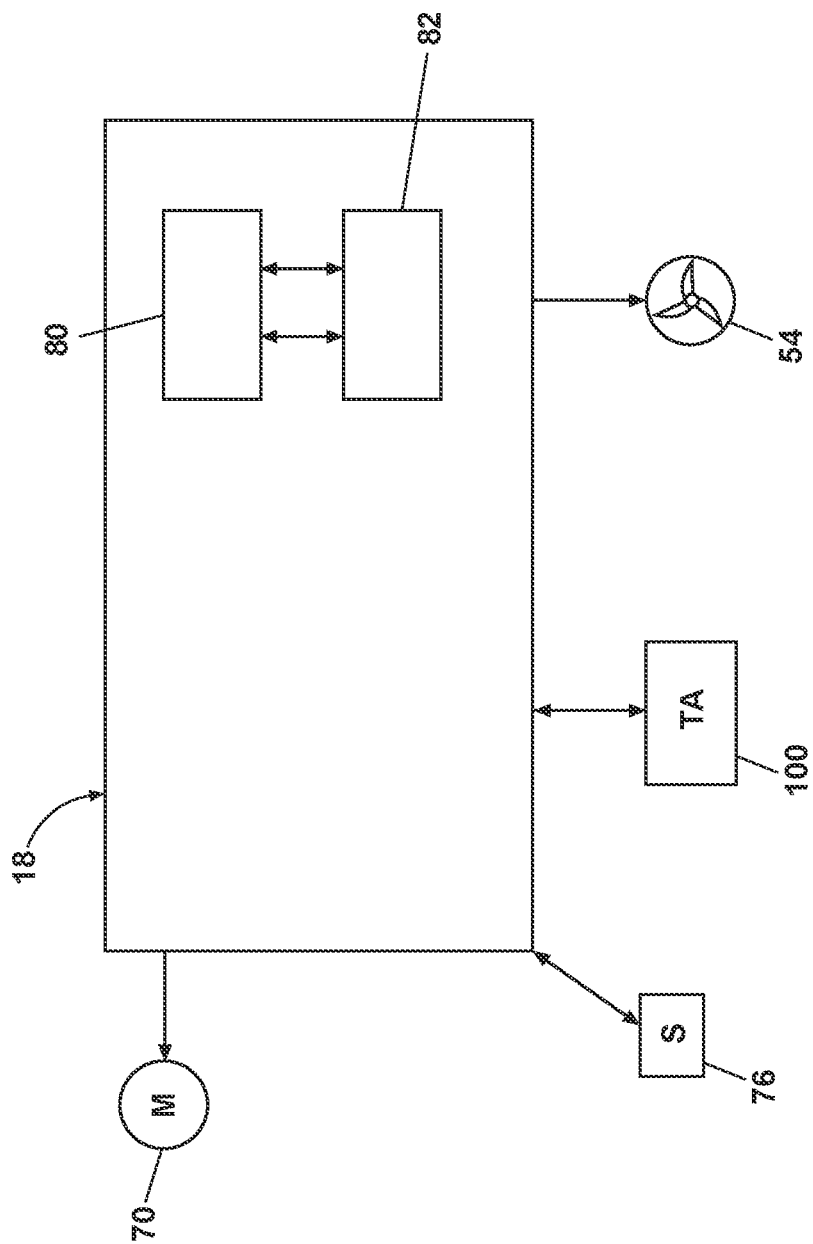
FIG. 3 is a block diagram of a control system of the food recycler of FIG. 1.

Referring now to FIG. 3, a schematic of the controller 18 for controlling the operation of the food recycler 10 is illustrated. The controller 18 can be provided with a memory 80 and a central processing unit (CPU) 82. The memory 80 can be used for storing the control software that is executed by the CPU 82 in completing a cycle of operation using the food recycler 10 and any additional software. The memory 80 can also be used to store information, such as a database or table, and to store data received from one or more components of the food recycler 10 that can be communicably coupled with the controller 18.

The controller 18 can be operably coupled with one or more components of the food recycler 10 for communicating with and controlling the operation of the component to complete a cycle of operation. For example, the controller 18 can be operably coupled with the motor assembly 70 to control the operation of the motor assembly 70. In another example, the controller 18 can be operably coupled to a fan 54 for selectively operating the air supply system 32. The controller 18 can also be coupled with the one or more sensors 76 provided in one or more of the systems of the food recycler 10 to receive input from the sensors. The controller 18 can be further operably coupled to the transfer assembly 100 to selectively permit the at least partially recycled food waste to be transferred from the mixing bin 24 to the output bin 25 by controlling the movement of the transfer assembly 100 between the opened and closed positions.

Figure 4:
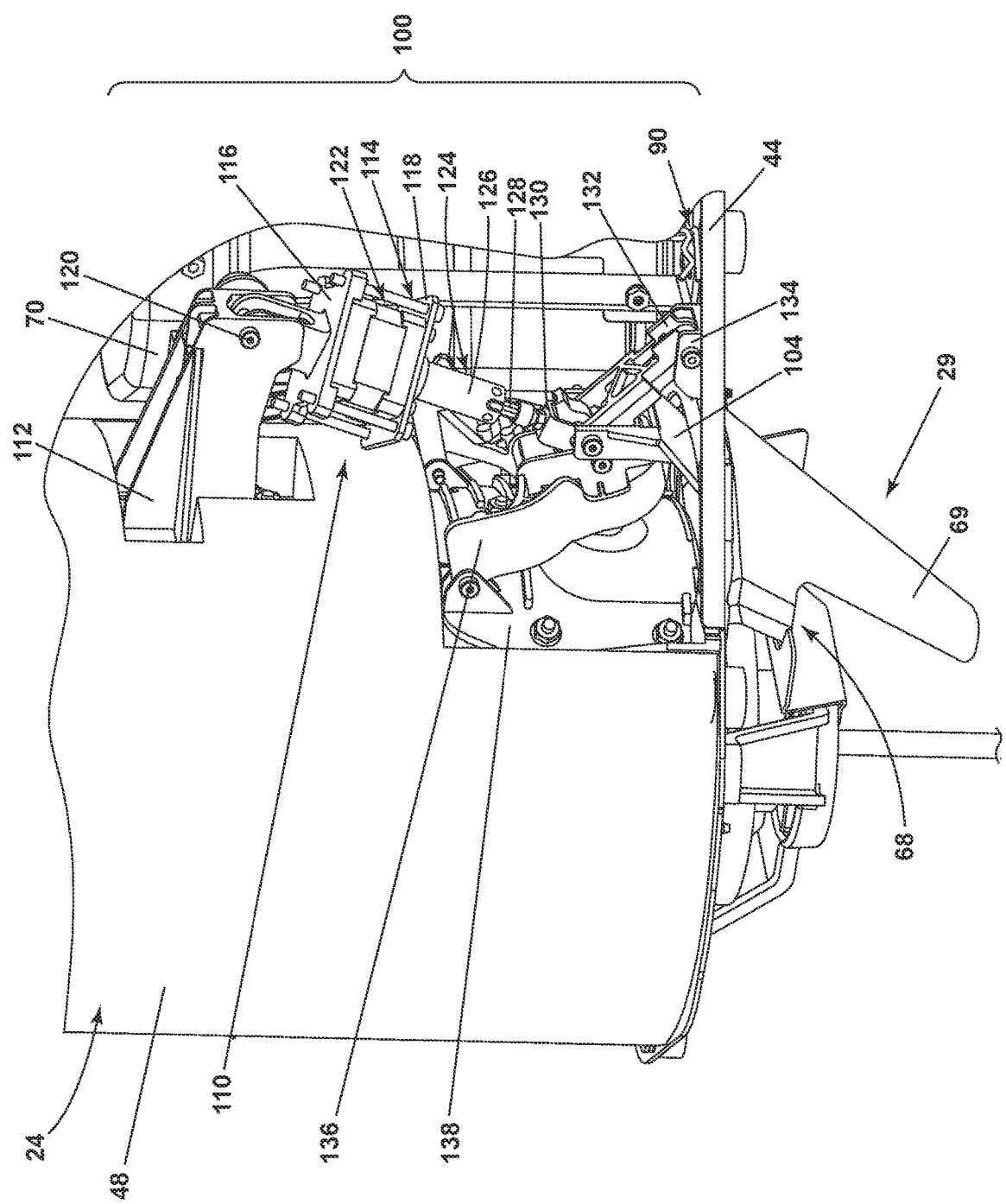
FIG. 4 is a side perspective view of the food recycler of FIG. 2 including a transfer assembly for transferring food waste from a mixing bin to an output bin.

FIG. 4 illustrates a side perspective view of a portion of the food recycler 10, in which details of the transfer assembly 100 can be better seen. The motor assembly 70, the mixing bin 24, and at least a portion of the transfer assembly 100 are coupled to the mounting plate 44. Connector assemblies 90 can couple any of the components, including the motor assembly 70, the mixing bin 24, and the transfer assembly 100 to the mounting plate 44, and can also be used to couple the mounting plate 44 to the mounting brackets 40.

The transfer assembly 100, and specifically the mechanical mover 110, can comprise a transfer assembly bracket 112 that is coupled to the side wall 48 of the mixing bin 24. The transfer assembly bracket 112 can be coupled to a motor bracket 114. The motor bracket 114 can comprise an upper motor bracket portion 116 and a lower motor bracket portion 118. The motor bracket 114, and specifically the upper motor bracket portion 116 can be coupled to the transfer assembly bracket 112 via a coupling pin 120 such that rotational movement is permitted between the upper motor bracket portion 116 and the transfer assembly bracket 112 as the mechanical mover 110 moves between the opened and closed positions. The motor bracket 114 carries, between the upper motor bracket portion 116 and the lower motor bracket portion 118, an actuator motor 122 for actuating the mechanical mover 110 between the opened and closed positions. The actuator motor 122 is operably coupled with the controller 18, as well as to an actuator shaft 124. In one non-limiting example, the actuator motor 122 can be provided as a stepper motor coupled to the linear actuator assembly, though it will be understood that any suitable type of motor can be used, such that the provided motor uses electrical energy to cause the mechanical mover 110 to move in a linear direction between opened and closed positions. The actuator shaft 124 comprises an outer shaft 126 within which an inner shaft 128 is telescopingly received for movement relative to the outer shaft 126. A lower end of the inner shaft 128 can be coupled to a coupling bracket 130, which can be, by way of non-limiting example, a U-shaped coupling bracket 130.

The coupling bracket 130 serves as a coupling joint for coupling the mechanical mover 110 to multiple features of the transfer assembly 100. The coupling bracket 130 can be coupled to at least one door link 132. A transfer assembly base plate 134 can be coupled to the mounting plate 44. The at least one door link 132 can comprise a first short link and a second long link that couple to the transfer assembly base plate 134 to provide a revolute joint between the coupling bracket 130 and the transfer assembly base plate 134. The coupling bracket 130 can further be coupled to the scraper 104 that is at least partially received within the chute 29. Further still, the coupling bracket 130 can be coupled to the transfer door 136, which includes the outlet door 102. A door plate 138 can be coupled to both the transfer assembly base plate 134 and the side wall 48 of the mixing bin 24. The transfer door 136 can be coupled also to the door plate 138. By the coupling of the multiple structures to the coupling bracket, the movement of both the scraper 104 and the transfer door 136, and thus the outlet door 102, can be controlled concurrently by mechanical mover 100 such that movement of the outlet door 102 and the scraper 104 are provided in conjunction with one another.

Figure 5:
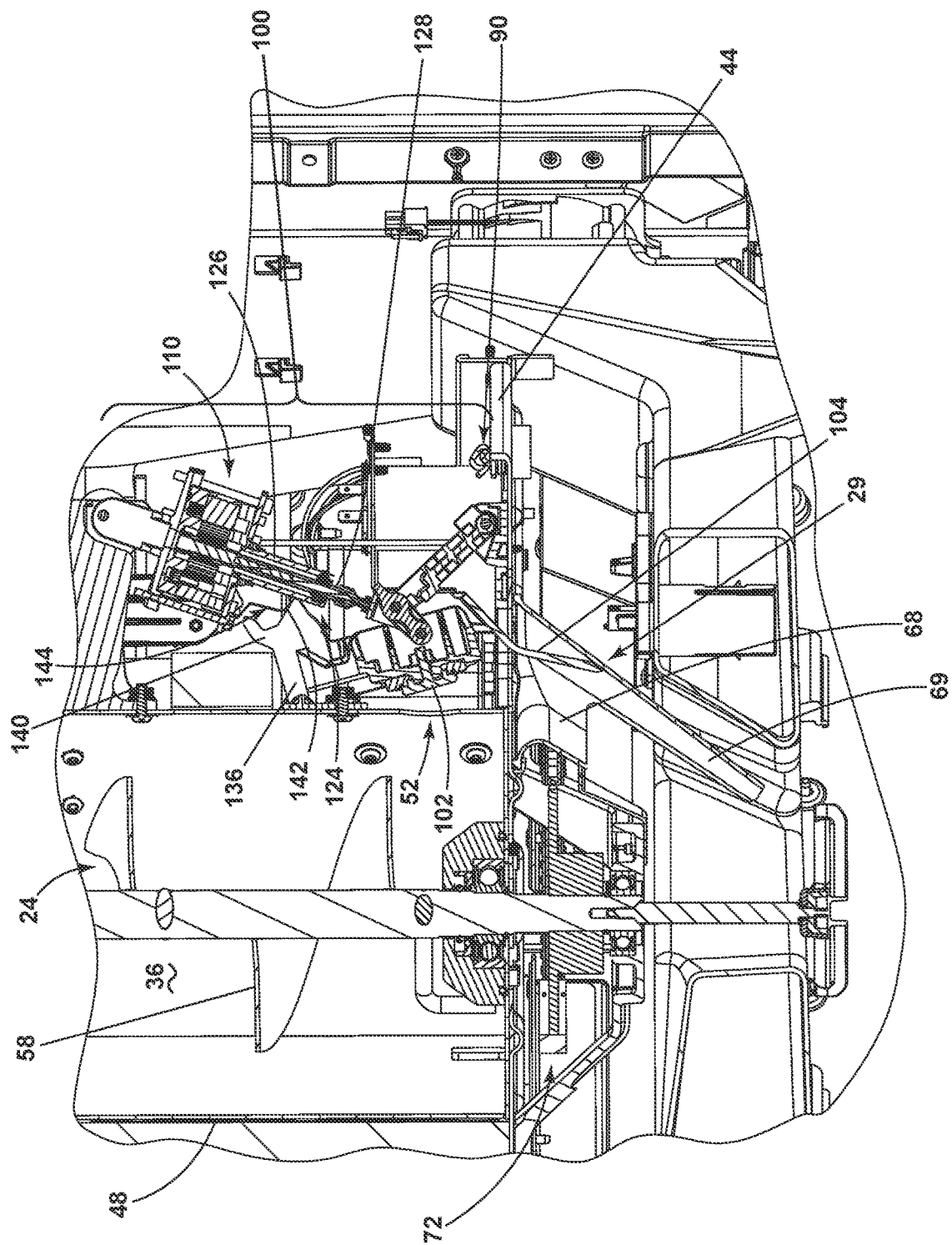
FIG. 5 is a cross-sectional view of the transfer assembly of FIG. 4 with a mechanical mover of the transfer assembly in an opened position.

FIG. 5 illustrates an enlarged cross-sectional view of a portion of the food recycler 10. The chute 29 can comprise a funnel portion 68 and an open slide portion 69. The funnel portion 68 can be thought of as at least partially enclosing the chute 29. The funnel portion 68 can be positioned proximate one of the mixing bin outlet 52 or the output bin inlet 64, while the open slide portion 69 is positioned proximate the other of the mixing bin outlet 52 or the output bin inlet 64. As illustrated herein, the funnel portion 68 is proximate the mixing bin outlet 52 while the open slide portion 69 is proximate the output bin inlet 64. The mixing bin outlet 52 can overlie the funnel portion 68 of the chute 29. The open slide portion 69 of the chute 29 can overlie the output bin inlet 64. In this way, the chute 29 can operably couple the mixing bin outlet 52 with the output bin inlet 64.

The funnel portion 68 can have a height that is selected such that the funnel portion 68 extends downwardly away from the mixing bin 24 at least past the position of the drive train 72. In this way, the funnel portion 68 has a height sufficient to protect the drive train 72 and ensure that the recycled food waste passing through the chute 29 cannot contact the drive train 72. The open slide portion 69 is provided to further aid in preventing recycled food waste from building up within the chute 29 by defining an open portion so the recycled food waste can move freely and not build up in what could otherwise be a smaller outlet of the chute 29. The draft angle of the chute 29 can be selected such that it matches the angle at which the scraper 104 is downwardly moved. By way of non-limiting example, the draft angle of the chute 29 can be between fifty and fifty-five degrees, optionally the draft angle of the chute 29 can be 53.5 degrees. Further, the chute 29 can be formed from a material having self-lubricating properties, a non-limiting example of which includes polyoxymethylene (POM), to further encourage the movement of recycled food waste down the chute 29 and prevent backup or blockage of the chute 29.

The scraper 104 is mounted to and operably coupled to the mechanical mover 110 and the outlet door 102 and is configured to contact the chute 29 and to move or slide downwardly along the chute 29 from the raised position to the lowered position as the mechanical mover 110 moves between the opened position and the closed position. It will be understood that the scraper 104 can be any suitable shape and configuration for moving or pushing recycled food waste down the chute 29, non-limiting examples of which include a scoop shape or a trowel.

The transfer assembly 100 is shown with the mechanical mover 110 in the opened position. The outlet door 102 can be selectively received within the mixing bin outlet 52 and is configured to selectively open and close the mixing bin outlet 52. Further, the outlet door 102 can selectively allow the passage of the at least partially recycled food waste through the mixing bin outlet 52 as the mechanical mover 110 and the outlet door 102 are moved between the opened position and the closed position. In the opened position, the transfer door 136 is in an opened position such that the outlet door 102 is not received within the mixing bin outlet 52, allowing the recycled food waste to flow out from the mixing bin 24 through the mixing bin outlet 52. Further, the scraper 104 is in the raised position, so the recycled food waste exiting the mixing bin 24 through the mixing bin outlet 52 can fall by the force of gravity from the mixing bin outlet 52 onto the chute 29 and downwardly toward the output bin 25. The food waste exiting the mixing bin 24 is guided down the chute 29 by the funnel portion 68 of the chute 29. Further, in the opened position of the mechanical mover 110, the inner shaft 128 is fully received within the outer shaft 126 of the actuator shaft 124. It can also be seen in FIG. 5 that the transfer door 136 further comprises a first cam 140 and a second cam 142 that can selectively interact with a transfer door sensing assembly 144, which will be described in more detail in FIGS. 7 and 8.

Figure 6:
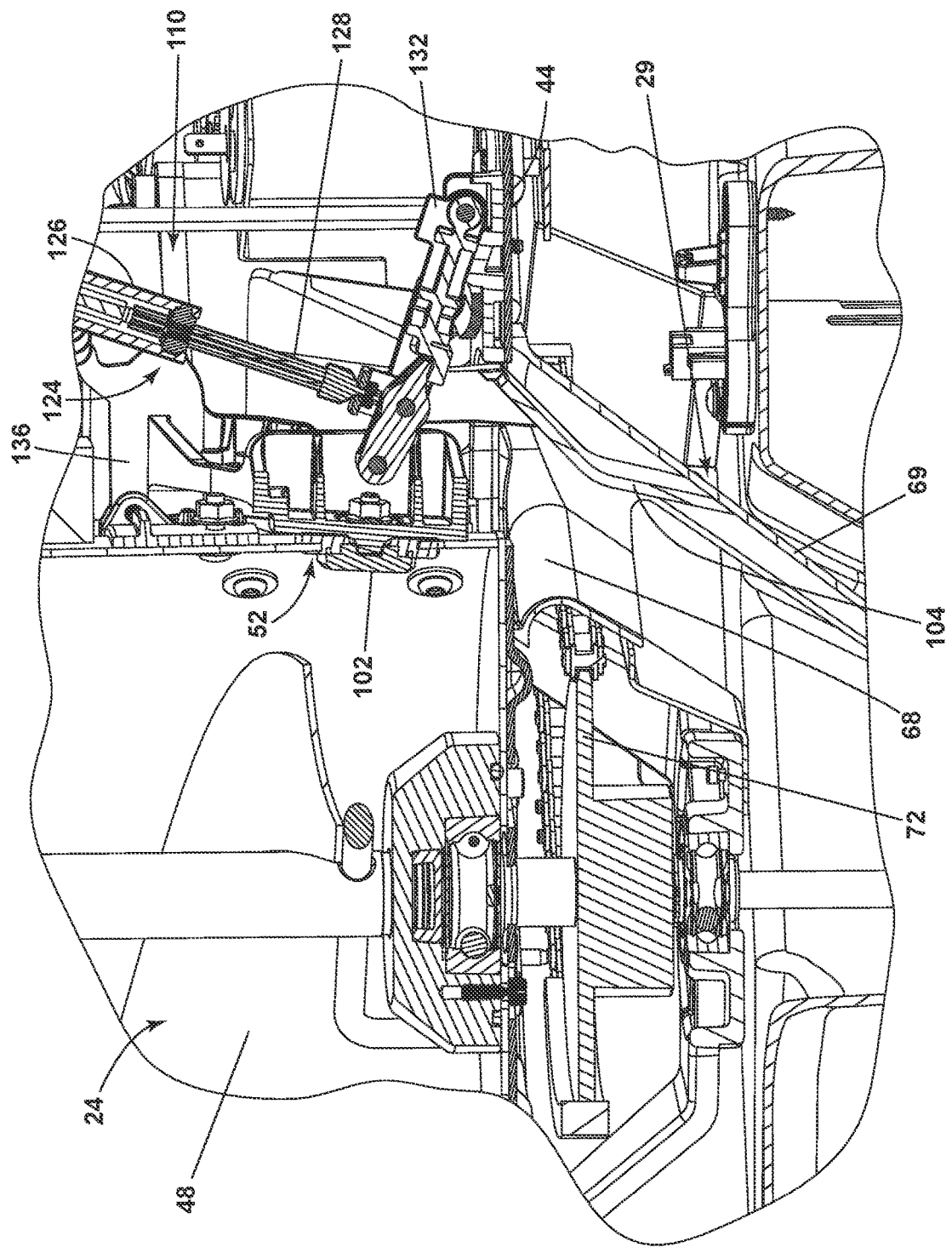
FIG. 6 is a cross-sectional view of the transfer assembly of FIG. 5 with the mechanical mover of the transfer assembly in a closed position.

FIG. 6 illustrates a cross-sectional view of the transfer assembly 100 with the mechanical mover 110 in the closed position. In the closed position, the transfer door 136 is in a closed position such that the outlet door 102 is received within the mixing bin outlet 52, and prevents food waste from exiting the mixing bin 24 through the mixing bin outlet 52. The outlet door 102 can be provided as a seal that is over-molded onto the transfer door 136, or can include a separate seal to fluidly seal between the mixing bin outlet 52 and the outlet door 102. In the closed position of the mechanical mover 110, the inner shaft 128 extends from the outer shaft 126 of the actuator shaft 124. Further, the scraper 104 is in the lowered position.

As the mechanical mover 110 moves from the opened position of FIG. 5 to the closed position, the transfer door 136 moves from the opened position to the closed position, gradually cutting off the flow of recycled food waste through the mixing bin outlet 52 as the outlet door 102 is received within the mixing bin outlet 52. As this occurs, the scraper 104 is concurrently moved from the raised position to the lowered position, which results in the scraper 104 moving downwardly along at least a portion of the chute 29 to assist in moving any recycled food waste that may remain in the chute 29 in being moved from the funnel portion 68 down along the open slide portion 69 and toward the output bin 29. Thus, the movement of the scraper 104 along with the transfer door 136 aids in preventing backing up of recycled food waste within the chute 29. Further, when the scraper 104 is moved to the lowered position to scrape the recycled food waste from the chute 29, the height of the funnel portion 68 ensures that the recycled food waste is not pushed toward or flung into the drive train 72. It is contemplated that the mechanical mover 110 can be provided in the closed position to keep the mixing bin outlet 52 closed during a mixing cycle of operation of the food recycler 10, while the mechanical mover 110 is provided in the opened position to allow passage of recycled food waste through the mixing bin outlet 52 during the transfer cycle of operation of the food recycler 10.

Figure 7:
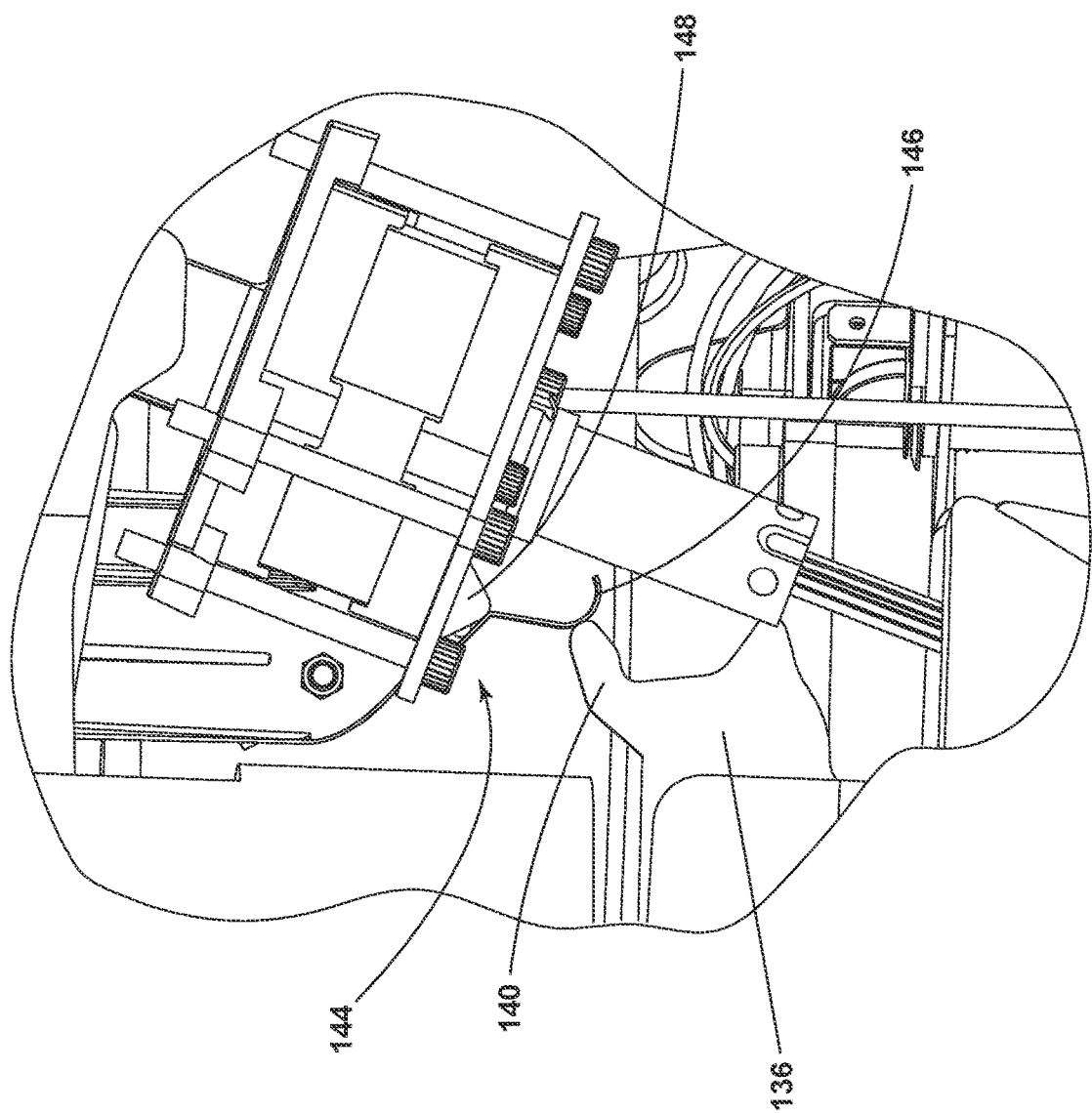
FIG. 7 is an enlarged side view of a transfer door sensing assembly for use with the transfer assembly of FIG. 4 with a transfer door of the transfer assembly in a closed position.

FIG. 7 illustrates an enlarged side view of the transfer door sensing assembly 144. The transfer door sensing assembly 144 can be mounted or coupled to the transfer assembly bracket 112. The transfer door sensing assembly 144 can be operably coupled with the controller 18 to provide input to the controller 18 indicating the closed or opened position of the transfer door 36. In FIG. 7, the transfer door 136 is in the closed position, such that the outlet door 102 is received within and closes the mixing bin outlet 52. When the transfer door 36 is in the closed position, the first cam 140 of the transfer door 36 contacts a sensing switch lever 146 of the transfer door sensing assembly 144 such that the sensing switch lever 146 can come into contact with a transfer door sensing switch 148.

Figure 8:
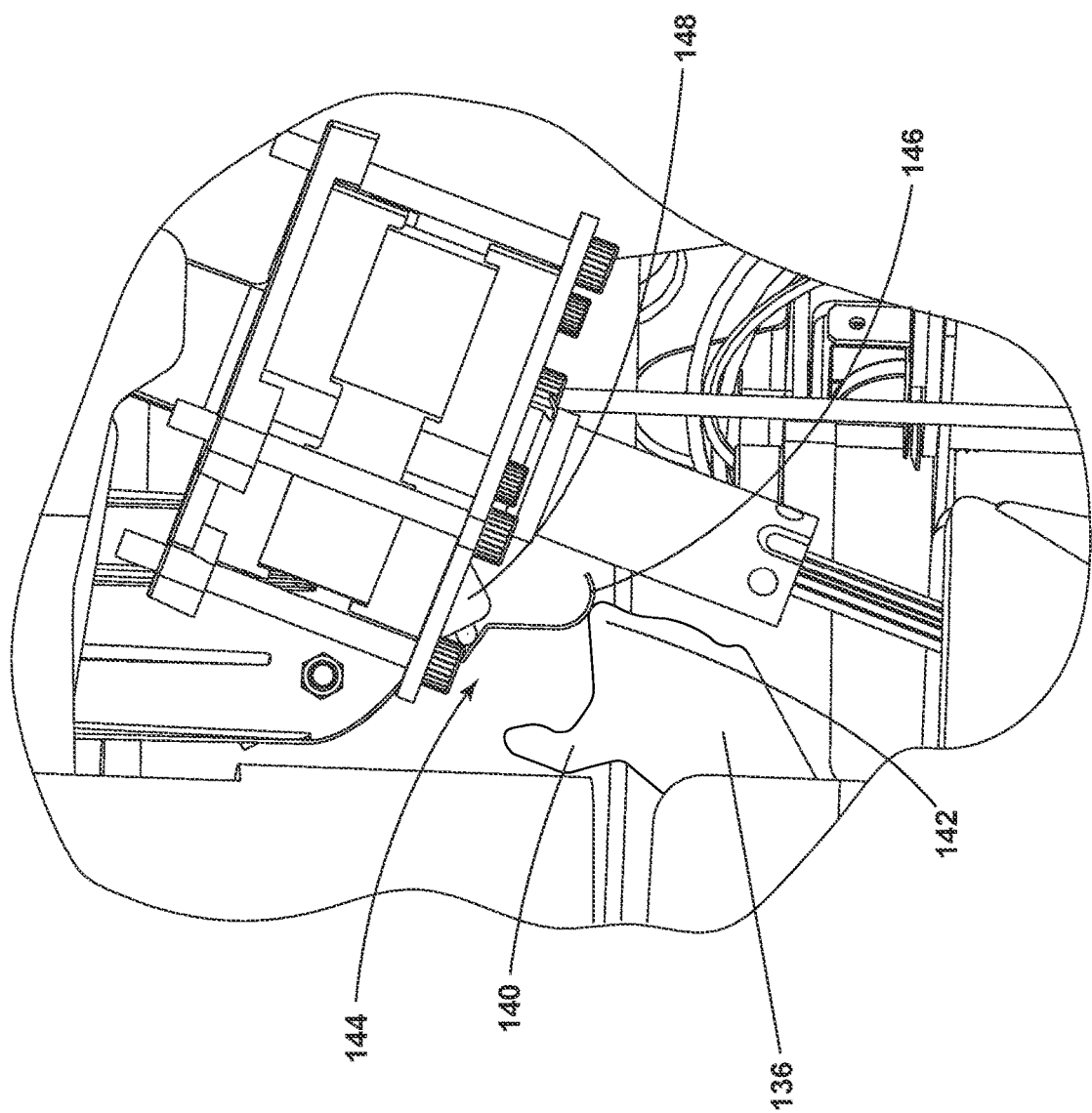
FIG. 8 is an enlarged side view of the transfer door sensing assembly of FIG. 7 with the transfer door in an opened position.

FIG. 8 illustrates an enlarged side view of the transfer door sensing assembly 144 when the transfer door 136 is in the opened position, such that the outlet door 102 is not received in the mixing bin outlet 52 and the mixing bin outlet 52 is open to allow transfer of recycled food waste from the mixing bin 24 to the chute 29. When the transfer door 36 is in the opened position, the second cam 142 of the transfer door 36 contact the sensing switch lever 146 such that the sensing switch lever 146 contacts the transfer door sensing switch 148, and further that the sensing switch lever 146 is deflected relative to the transfer door sensing switch 148 to send a signal to the controller 18 that the transfer door 36 is in the opened position. By way of non-limiting example, the transfer door sensing switch 148 can comprise a deflectable element that can be selectively deflected by the sensing switch lever 146 in either of the opened position or the closed positions such that the selective input to the controller 18 from the transfer door sensing switch 148 provides an indication of which position, either opened or closed, the transfer door 36 occupies.

Figure 9:
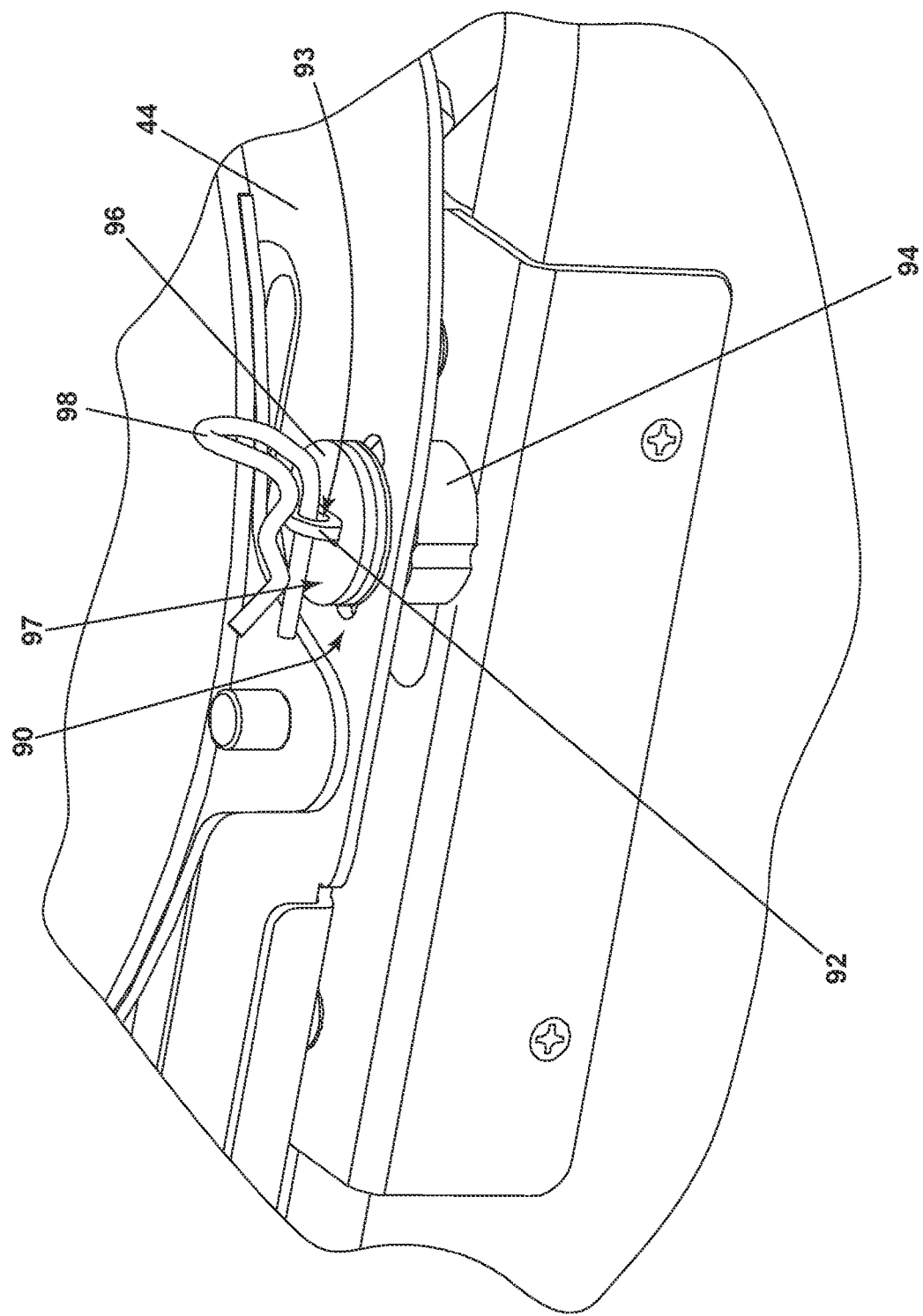
FIG. 9 is an enlarged perspective view of a connector assembly for use in the food recycler of FIG. 2.

FIG. 9 illustrates an enlarged perspective view of the connector assembly 90. The coupling of the mounting plate 44 to the mounting brackets 40, as well as the coupling of other components to the mounting plate 44, can result in vibration and noise within the food recycler 10 that can be unpleasant to a user. As such, connector assemblies 90 can be provided that are configured to reduce noise and vibration within the food recycler 10 as compared to conventional fastening means such as screws, a non-limiting example of which includes a bushed connector. It will be understood that any suitable number of connector assemblies 90 can be provided at any suitable attachment points within the food recycler 10.

The connector assembly 90 comprises a connector tab 92, a noise isolator 94, an isolator cap 96, and a cotter pin 98. The connector tab 92 can be defined by and extend upwardly or downwardly from the mounting plate 44, the mounting brackets 40, or a separate support surface formed by or coupled to the component to be coupled to the mounting plate 44. The connector tab 92 can define a pin opening 93 at an upper portion. The noise isolator 94 can be provided circumferentially about the connector tab 92. The noise isolator 94 can be formed of a rubber, a non-limiting example of which includes a thermoplastic elastomer (TPE), though it will be understood that any suitable noise isolating material can be used. The isolator cap 96 can also be provided circumferentially about the connector tab 92. The isolator cap 96 can define a top surface 97 against which the cotter pin 98 can bear. The isolator cap 96 can be formed of a plastic material and can prevent horizontal movement of the mounting plate 44 relative to the connector tab 92. The cotter pin 98 can be at least partially received within the pin opening 93 to resiliently bear against the top surface 97 of the isolator cap 96 to further restrict movement, specifically vertical movement, vibration, and resulting noise.

Figure 10:
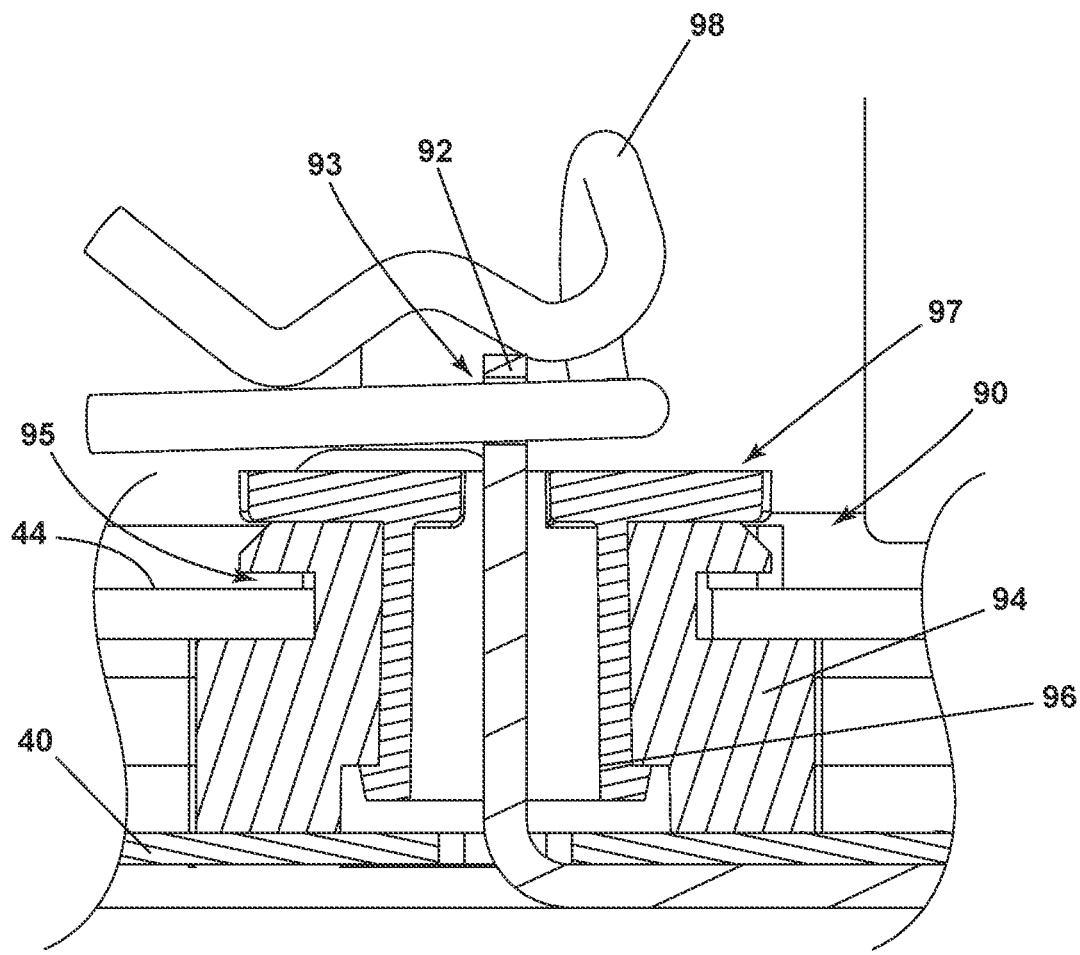
FIG. 10 is a cross-sectional view of the connector assembly of FIG. 9.

FIG. 10 illustrates a cross-sectional view of the connector assembly 96. In this view, it can be seen that the noise isolator 94 can define a channel 95 within which a mounting surface, such as the mounting plate 44, can be received such that the channel 95 restricts movement of the mounting plate 44 relative to the noise isolator 94. Further, it can be seen that the isolator cap 96, while being provided circumferentially about the connector tab 92, and can further be radially inward of the noise isolator 94.

Figure 11:
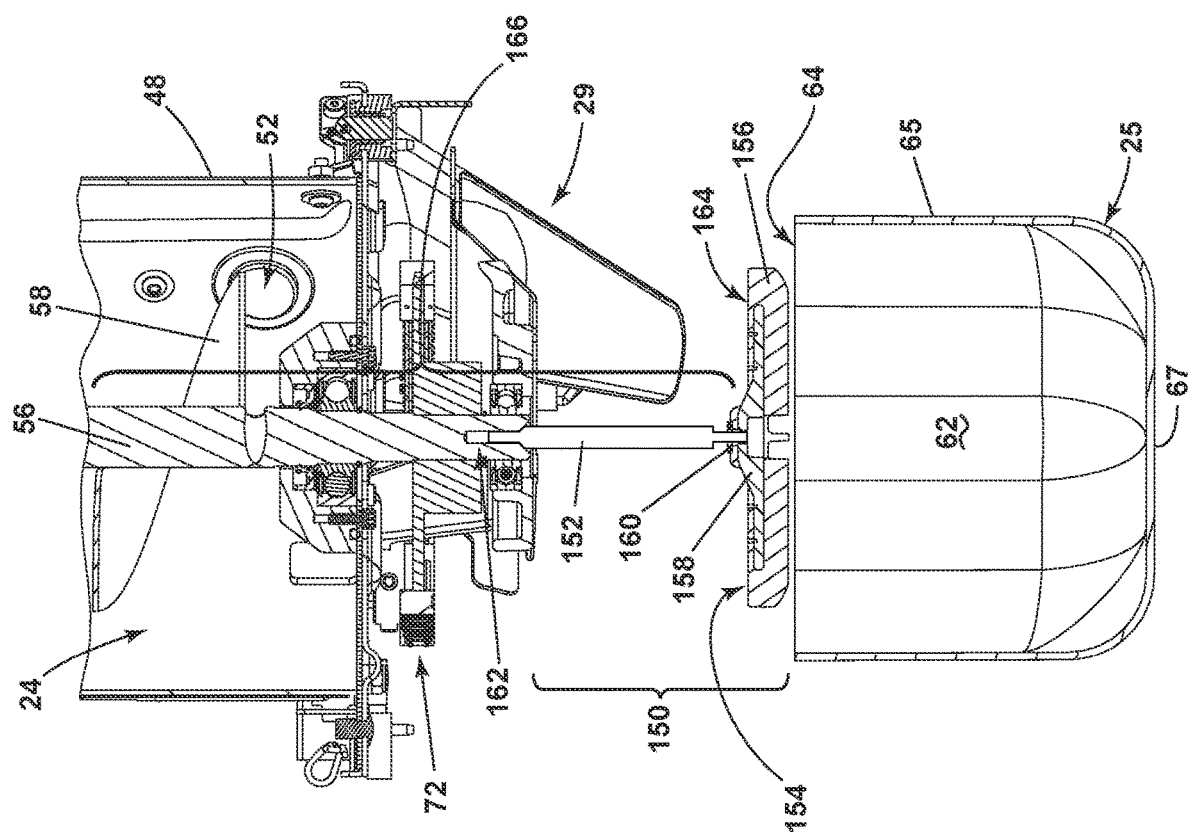
FIG. 11 is a cross-sectional view of a wiper assembly for use in the food recycler of FIG. 2.

FIG. 11 illustrates a cross-sectional view of the wiper assembly 150 that can be provided between the mixing bin 24 and the output bin 25. The wiper assembly 150 can be positioned below the chute 29, and specifically between the chute 29 and the output bin 25, such that the at least partially recycled food waste being transferred from the mixing bin 24 can pass over or between the at least one wiper 154 as it moves from the open slide portion 69 through the output bin inlet 64. In operation without the wiper assembly 150 present, the recycled food waste is provided from the mixing bin 24 to the chute 29 and falls by gravitational force from the chute 29 into the output bin 25 through the output bin inlet 64. This can result in an uneven distribution of recycled food waste within the output bin 25 as the recycled food waste tends to form a mound directly below the chute 29. When such a mound forms, the chute 29 can be blocked, or when a user would withdraw the output bin 25, recycled food waste could spill outside the output bin 25 as the mound below the chute 29 could extend to a height greater than the side portion 65. The wiper assembly 150 can be provided to avoid such a circumstance and to encourage uniform distribution of the recycled food waste throughout the output bin 25.

As described previously, the stirrer drive shaft 56 is coupled to the motor assembly 70 by the drive train 72. In this way, selective rotational movement of the stirrer drive shaft 56 is driven by the motor assembly 70. The wiper assembly 150 can be operably and rotationally coupled to the stirrer drive shaft 56 via the wiper drive shaft 152. The stirrer drive shaft 56 can be coupled, either removably or nonremovably, to the wiper drive shaft 152 at a shaft coupling joint 162 to form a common drive shaft 166 driven by the motor assembly 70 via operable coupling with the drive train 72. The coupling of the stirrer drive shaft 56 and the wiper drive shaft 152 can be any suitable type of coupling, non-limiting examples of which include a tapping connection, a threaded connection, a direct connection, or a snap-fit connection. Thus, rotation of the stirrer drive shaft 56 drives rotation of the wiper assembly 150 via the wiper drive shaft 152. The wiper drive shaft 152 can be coaxially arranged with the stirrer drive shaft 56.

The wiper assembly 150 can be selectively rotated in a clockwise direction, a counterclockwise direction, or in a back-and-forth pattern. Optionally, the wiper assembly 150 can be rotated throughout a transfer cycle of operation of the food recycler 10. As recycled food waste builds up within the output bin 25, the rotary motion of the wiper assembly 150 flattens the pile of recycled food waste and does not allow the recycled food waste to accumulation above the side portion 65 of the output bin 25. In one example, the wiper assembly 150 can be positioned just above the output bin 25, such that the output bin 25 can be withdrawn by a user without contacting the wiper assembly 150.

The wiper drive shaft 152 can couple to the wiper 154. A washer 160 can be provided between the wiper 154 and the wiper drive shaft 152. The washer 160 can at least partially form a friction joint that can cause rotation of the wiper assembly 150 to be stopped if the wiper assembly 150 encounters an obstacle, such as overflowing recycled food waste or a hand of the user. The wiper 154 can comprise a wiper body 158 that can define at least one arm 164 and can be formed of a plastic material, a non-limiting example of which includes polypropylene. While the wiper 154 is illustrated herein as a wiper 154 having four arms 164, it will be understand that any suitable number of arms 164 can be included, including a single arm 164. A flexible tip 156 can extend from at least one of the arms 164, and, for example, from each of the arms 164. The flexible tip 156 can be overmolded to the wiper body 158 and can be formed from a rubber material, a non-limiting example of which includes a thermoplastic elastomer. The flexible tip 156 can overlie at least a portion of the output bin 25, and specifically of the bottom portion 67 of the output bin 25.

While the wiper assembly 150 is illustrated herein as overlying the output bin 25 and being provided just above the output bin 25, it will be understood that the wiper assembly 150 can also be provided to be vertically movable relative to the output bin 25, such that the wiper assembly 150 can be lowered into and raised out of the output bin 25 to mix the contents within the output bin 25, but also to allow the access drawer 26 to be withdrawn by a user without contacting the wiper assembly 150.

Figure 12:
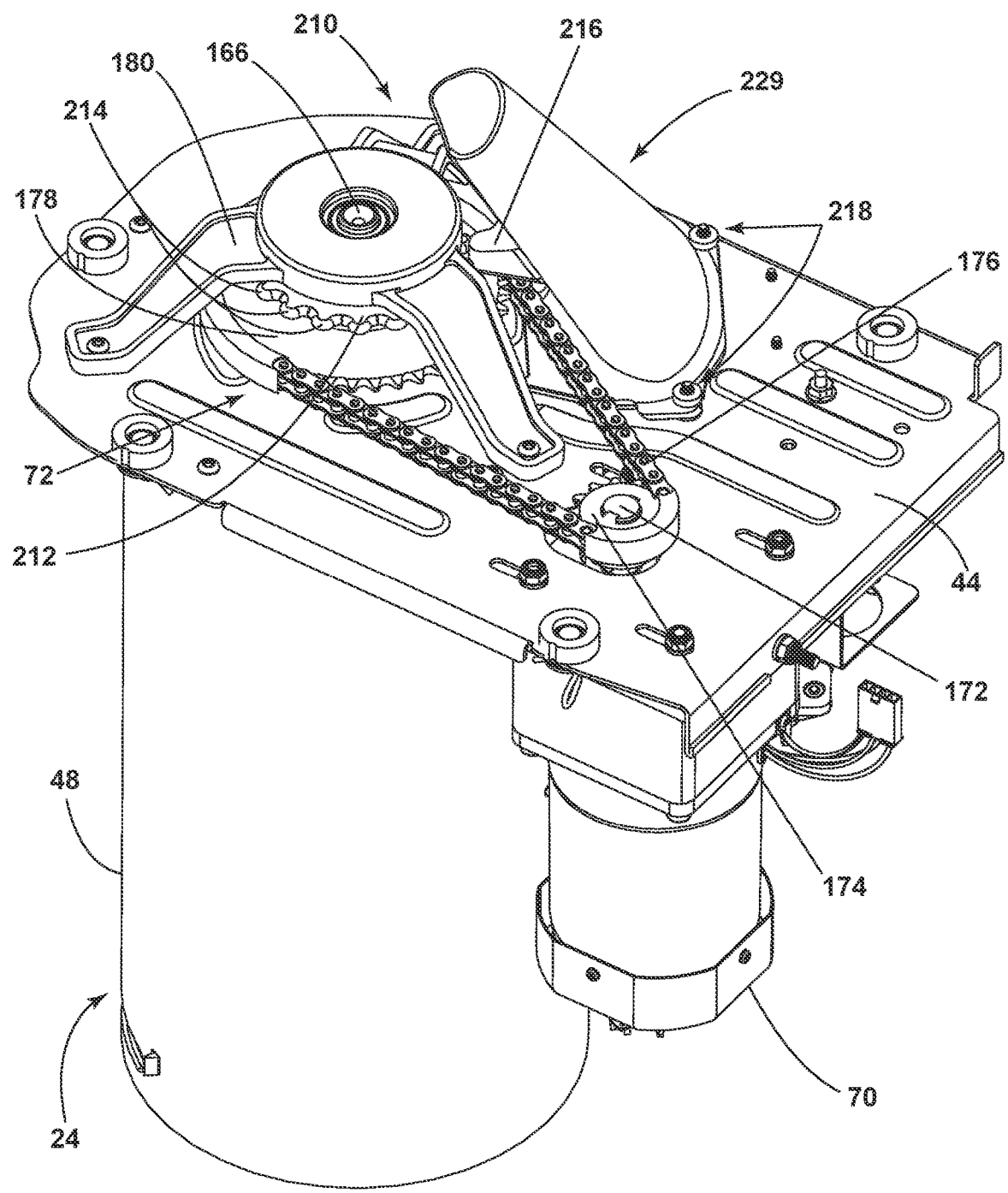
FIG. 12 is a bottom view of a drive train for use in the food recycler of FIG. 2 and including another example of a mechanical mover.

FIG. 12 illustrates a bottom view of the drive train 72 including another example of a mechanical mover 210. The motor assembly 70 can comprise an output shaft 172 that is rotationally driven by the motor assembly 70. The output shaft 172 can rotationally drive a drive gear 174 that is associated with the motor assembly 70. The drive gear 174 is operably coupled to a driven gear 178 to effect rotation of the driven gear 178 by a chain 176. The driven gear 178 is further associated with and operably coupled to the common drive shaft 166, or can be coupled to the stirrer drive shaft 56 or the wiper drive shaft 152 individually. Thus, the motor assembly 70 effects rotational movement of the common drive shaft 166 by the operable coupling of the drive gear 174, chain 176, and the driven gear 178. A lower bearing housing 180 couples the elements of the drive train to the mounting plate 44.

The mechanical mover 210 can be operably coupled to a chute 229 to mechanically move compost or recycled food waste from the mixing bin outlet 52 toward the output bin inlet 64 via the chute 229. The mechanical mover 210 can comprise a mechanical vibrator 212 coupled to the chute 229. Specifically, the mechanical vibrator 212 can be operably coupled to at least one of the driven gear 178, the common drive shaft 166, the stirrer drive shaft 56, or the wiper drive shaft 152 for rotational movement, and optionally can be coupled to any of those components by a sprocket (not shown). The mechanical vibrator 212 can define a plurality of protruding teeth 214 that extend radially outward from the mechanical vibrator 212. The mechanical mover 210 further comprises the chute 229, which can have a different shape and profile from the chute 29. Optionally, the chute 229 can be completely enclosed along its length. The chute 229 can be coupled to the mounting plate 44 by at least one damper connector 218. The chute 229 can comprise a protruding element 216 that can bear resiliently against the mechanical vibrator 212, and specifically against the protruding teeth 214.

Figure 13:
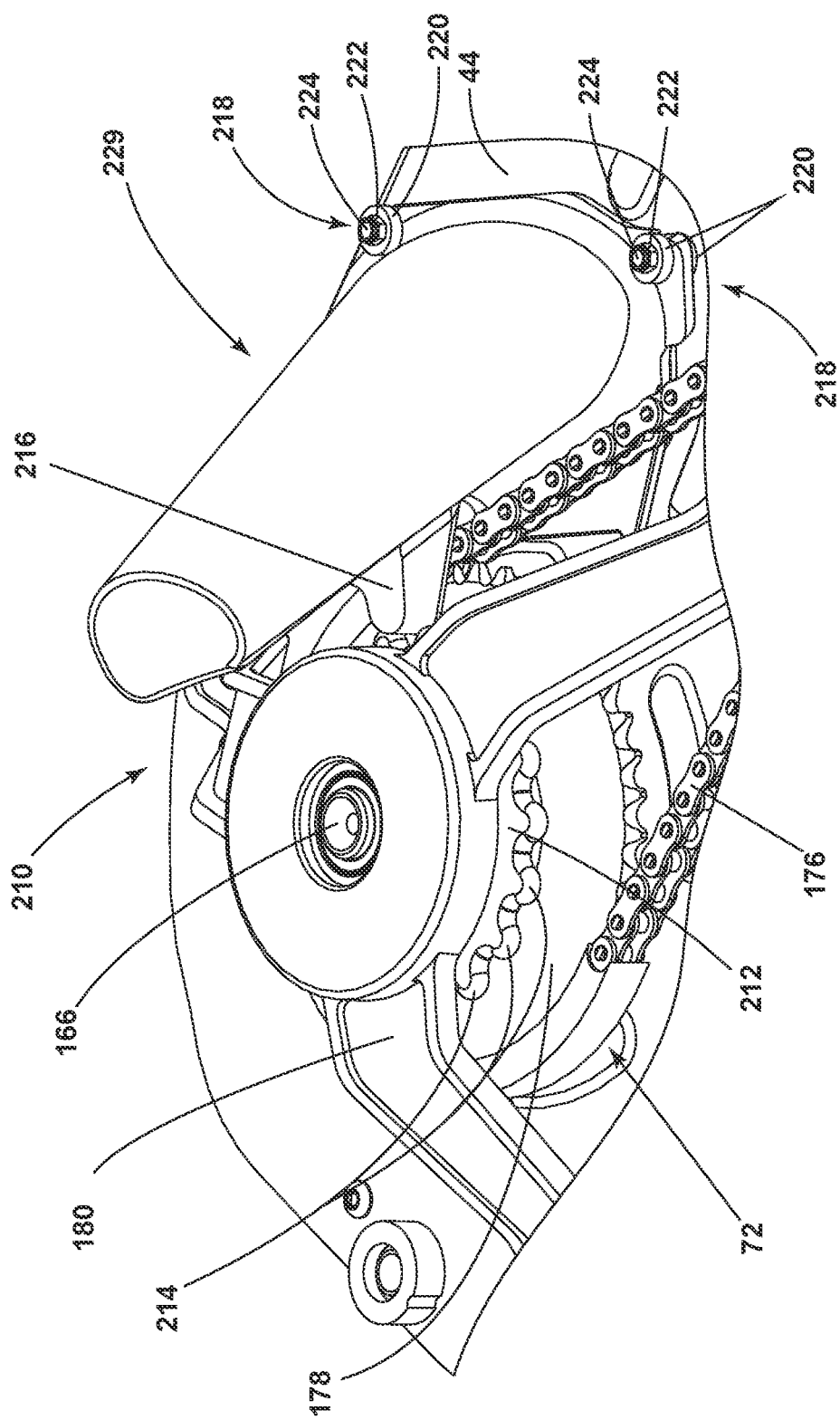
FIG. 13 is an enlarged bottom view of the mechanical mover of FIG. 12.

FIG. 13 illustrates an enlarged bottom view of the mechanical mover 210. The damper connectors 218 can comprise a bolt 224 that extends through the mounting plate 44 and the chute 229 and about which a threadable nut 222 is threadably received. The damper connectors 218 can further comprise at least one vibration damper 220, which can be formed from a damping material, non-limiting examples of which include a rubber or a foam. One vibration damper 220 can be provided about each bolt 224, between the mounting plate 44 and the chute 229, with a second vibration damper 220 provided about the bolt 224 between the chute 229 and the nut 222, though it will be understood that only one vibration damper 220 could be provided about each bolt 224. The damper connectors 218 allow some movement between the chute 229 and the mounting plate 44 by the resilient nature of the vibration dampers 220. The damper connectors 218 further serve to bias the chute 229, and specifically the protruding element 216, against the mechanical vibrator 212.

Turning now to the operation of the mechanical vibrator 212, as the mechanical vibrator 212 is rotated, the protruding element 216 selectively resiliently bears against the protruding teeth 214. Each time one of the protruding teeth 214 contacts the protruding element 216, the chute 229 is biased away from the mechanical vibrator 212. When the protruding teeth 214 rotate out of contact with the protruding element 216, the damper connectors 218 bias the chute 229 back to its original position, thus causing the chute 229 to move rapidly or to snap back into place. This movement of the chute 229 causes a vibration of the chute 229 which can serve to dislodge or vibrate loose any residual recycled food waste or compost that may remain in the chute 229 during or after a transfer cycle of operation of the food recycler 10.

Figure 14:
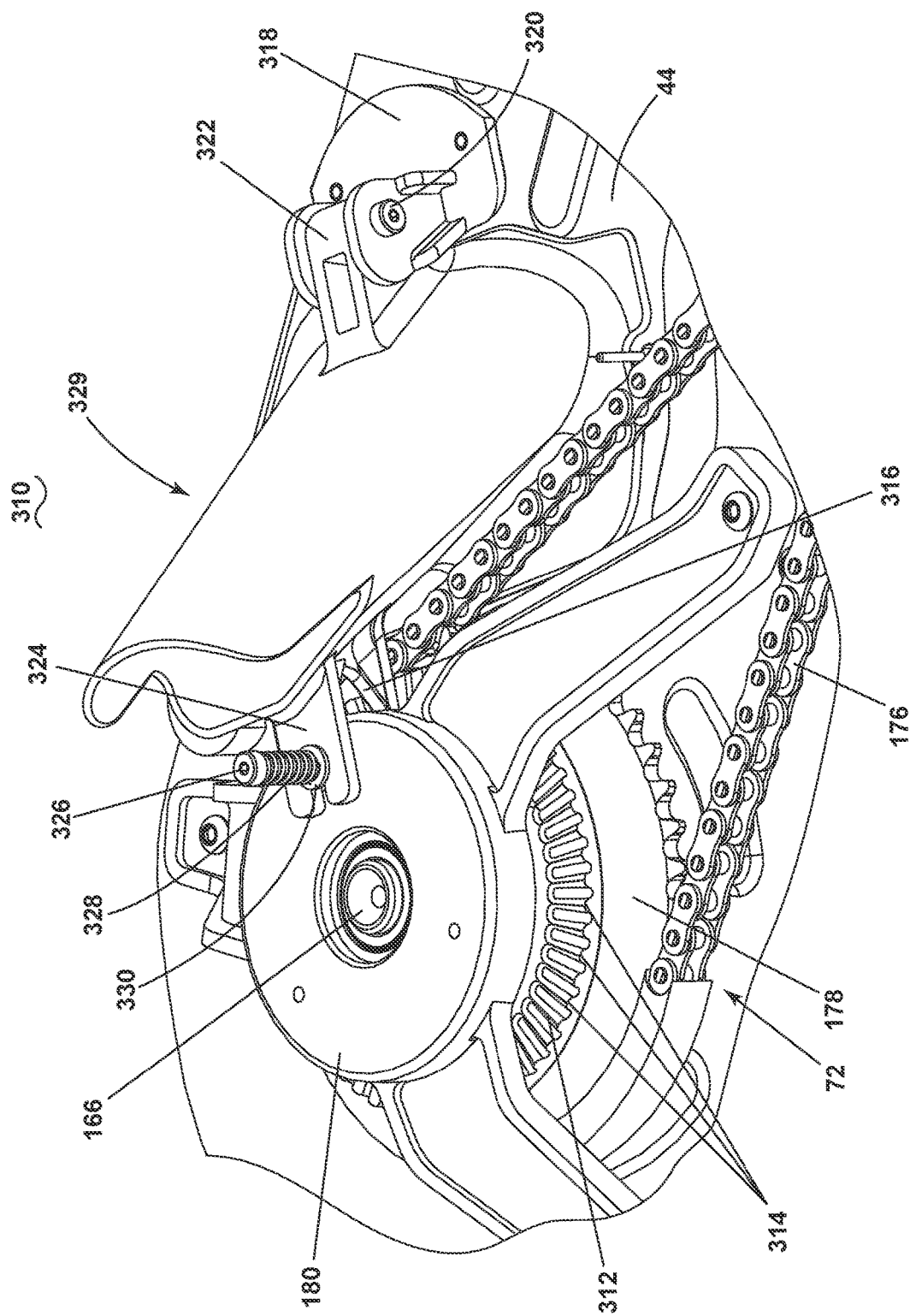
FIG. 14 is a bottom view of another example of a mechanical mover for use in the food recycler of FIG. 2.

FIG. 14 illustrates another example of a mechanical mover 310 that is operably coupled to a chute 329 to mechanically move compost or recycled food waste from the mixing bin outlet 52 toward the output bin inlet 64 via the chute 329. The mechanical mover 310 comprises a mechanical vibrator 312 coupled to the chute 329. Specifically, the mechanical vibrator 312 can be operably coupled to at least one of the driven gear 178, the common drive shaft 166, the stirrer drive shaft 56, or the wiper drive shaft 152 for rotational movement, and optionally can be coupled to any of those components by a sprocket (not shown). The mechanical vibrator 312 can define a plurality of protruding teeth 314 that extend radially outward and upward from a surface of the mechanical vibrator 312. The mechanical mover 310 further comprises the chute 329, which can have a different shape and profile from the chute 29 and the chute 229. By way of non-limiting example, the chute 329 can be completely enclosed along its length or along a majority of its length.

The chute 329 can be coupled to the mounting plate 44 by a chute hinge 318. The chute 329 can comprise a pivot joint 322 that is pivotably coupled to the chute hinge 318 via a hinge pin 320. The pivotable coupling of the pivot joint 322 and the chute hinge 318 allows the chute 329 to be selectively pivoted away from the mounting plate 44 about an axis of rotation defined by the hinge pin 320. The chute 329 can further comprise a protruding element 316 that can bear resiliently against the mechanical vibrator 312, and specifically against the protruding teeth 314 of the mechanical vibrator 312.

A fastening flange 324 can protrude from the chute 329 adjacent the lower bearing housing 180. Specifically, the fastening flange 324 can confront the lower bearing housing 180. A bolt 326 can extend downwardly from or through the lower bearing housing 180 and can be received within the fastening flange 324. A compression spring 328 can be provided circumferentially about the bolt 326. A washer 330 can be provided between the compression spring 328 and the fastening flange 324. The compression spring 328 and the fastening flange 324 serve to bias the chute 329, and specifically the protruding element 316, against the mechanical vibrator 312.

Turning now to the operation of the mechanical vibrator 312, as the mechanical vibrator 312 is rotated, the protruding element 316 selectively resiliently bears against the protruding teeth 314. Each time one of the protruding teeth 314 contacts the protruding element 316, the chute 329 is biased away from the mechanical vibrator 312 against the force of the compression spring 328. When the protruding teeth 314 rotate out of contact with the protruding element 316, the compression spring 328 biases the chute 329 back to its original position, thus causing the chute 329 to move rapidly or to snap or spring back into place. This movement of the chute 329 causes a vibration of the chute 329 which can serve to dislodge or vibrate loose any residual recycled food waste or compost that may remain in the chute 329 during or after a transfer cycle of operation of the food recycler 10.

The aspects disclosed herein provide a food recycler having a variety of features designed to improve the operation and user experience with the food recycler. Examples of mechanical movers are provided to prevent the buildup of recycled food waste within the chute as the recycled food waste moves from the mixing bin to the output bin. Connectors are also described that can reduce the transfer of noise and vibration within the food recycler to provide a more quiet and pleasing user experience. A transfer door is described to effectively selectively allow the passage of recycled food waste from the mixing bin to the output bin. The design and the shape of the chute can also optimize the transfer of recycled food waste from the mixing bin to the output bin to prevent recycled food waste from going outside of the chute while also preventing build-up within the chute. The wiper can prevent the piling up of recycled food waste at one position within the output bin and instead promote even distribution of the recycled food waste within the output bin.

To the extent not already described, the different features and structures of the various aspects of the present disclosure can be used in combination with each other as desired. That one feature cannot be illustrated in all of the aspects of the present disclosure is not meant to be construed that it cannot be, but is done for brevity of description. Thus, the various features of the different aspects of the present disclosure can be mixed and matched as desired to form new aspects, whether or not the new aspects are expressly described. Moreover, while "a set of" various elements have been described, it will be understood that "a set" can include any number of the respective elements, including only one element. Combinations or permutations of features described herein are covered by this disclosure.

This written description uses examples to disclose aspects of the present disclosure, and also to enable any person skilled in the art to practice aspects of the present disclosure, including making and using any devices or systems and performing any incorporated methods, though it is to be understood that these examples are by way of illustration and not of limitation. The patentable scope of the aspects of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Hence, specific dimensions and other physical characteristics relating to the aspects of the present disclosure are not to be considered as limiting, unless expressly stated otherwise.

What is claimed is:

1. A food recycler comprising:
   a housing defining an interior and an access opening to the interior;
   a mixing bin located within the interior and defining a mixing chamber having a first inlet accessible via the access opening and a first outlet;
   an output bin defining an output chamber having a second inlet and a second outlet; and
   a transfer assembly for transferring food waste from the mixing bin to the output bin, the transfer assembly comprising:
      a chute mounted to the housing and operably coupling the first outlet of the mixing bin to the second inlet of the output bin; and
      at least one vibration damper positioned between the housing and the chute configured to allow flexibility of the chute to vibrate relative to the housing.

2. The food recycler of claim 1, further comprising a mechanical vibrator configured to rotate and comprising a plurality of teeth.

3. The food recycler of claim 2, wherein the chute resiliently bearing against the mechanical vibrator such that rotation of the mechanical vibrator causes the chute to vibrate in an up and down matter when the chute engages and disengages with the plurality of teeth.

4. The food recycler of claim 3, wherein the mechanical vibrator comprises a side surface positioned orthogonal to the plurality of teeth and the chute resiliently bears against the side surface.

5. The food recycler of claim 4, wherein the chute comprises a protruding element on the side surface and the protruding element resiliently bears against the side surface.

6. The food recycler of claim 1, further comprising a pivot joint pivotably mounting the chute to the housing.

7. The food recycler of claim 6, further comprising a hinge pin coupling the chute to the housing.

8. The food recycler of claim 6, wherein the chute further comprises a fastening flange positioned adjacent a lower bearing of the housing.

9. The food recycler of claim 8, further comprising a bolt extending through the lower bearing housing and received by the fastening flange.

10. The food recycler of claim 9, further comprising a compression spring circumferentially about the bolt.

11. The food recycler of claim 10, wherein the compression spring and fastening flange bias the chute against a mechanical vibrator.

12. The food recycler of claim 1, wherein at least a portion of the output chamber is directly below a portion of the mixing chamber.

13. The food recycler of claim 12, wherein the mixing bin comprises a cylinder with an open top defining the first inlet.

14. The food recycler of claim 12, wherein the first outlet is located in a side of the mixing bin and the second inlet is located in a top of the output bin.

15. The food recycler of claim 1, wherein the chute comprises a funnel portion and an open slide portion.

16. The food recycler of claim 15, wherein the funnel portion is proximate one of the first outlet or the second inlet and the open slide portion is proximate the other of the first outlet or second inlet.

17. The food recycler of claim 16, wherein the funnel portion is proximate the first outlet and the open slide portion is proximate the second inlet.

18. The food recycler of claim 17, wherein the first outlet is in one of a side or bottom of the mixing bin.

19. The food recycler of claim 18, wherein the second inlet is in one of a top of the output bin or a side of the output bin.

20. The food recycler of claim 19, wherein the second outlet is in the side of the output bin.

* * * * *